United States Patent [19]

Untereker

[11] 4,430,397

[45] Feb. 7, 1984

[54] ELECTROCHEMICAL CELLS

[75] Inventor: Darrel F. Untereker, Cedar, Minn.

[73] Assignee: Medtronic, Inc., Minneapolis, Minn.

[21] Appl. No.: 280,902

[22] Filed: Jul. 6, 1981

[51] Int. Cl.³ .................................. H01M 6/18
[52] U.S. Cl. ............................ 429/191; 429/213; 29/623.1
[58] Field of Search ............... 429/191, 213; 29/623.1

[56] References Cited

U.S. PATENT DOCUMENTS

| | | | |
|---|---|---|---|
| 3,352,720 | 11/1967 | Wilson et al. | 136/137 |
| 3,660,163 | 5/1972 | Moser | 136/83 R |
| 3,660,164 | 5/1972 | Hermann et al. | 136/83 R |
| 3,674,562 | 7/1972 | Schneider et al. | 136/83 R |
| 3,957,533 | 5/1976 | Mead et al. | 429/213 |
| 4,071,662 | 1/1978 | Mead et al. | 429/178 |
| 4,105,833 | 8/1978 | Greatbatch et al. | 429/178 |
| 4,132,836 | 1/1979 | Greatbatch | 429/199 |
| 4,135,519 | 1/1979 | Greatbatch | 429/193 |
| 4,148,975 | 4/1979 | Schneider et al. | 429/213 |
| 4,157,433 | 6/1979 | Phillips | 429/213 |
| 4,166,887 | 9/1979 | Mueller et al. | 429/191 |
| 4,182,798 | 1/1980 | Skarstad | 429/213 |
| 4,211,832 | 7/1980 | Mueller et al. | 429/213 |
| 4,267,244 | 5/1981 | Louzos | 429/213 |

*Primary Examiner*—Donald L. Walton
*Attorney, Agent, or Firm*—Schroeder, Siegfried, Vidas & Arrett

[57] ABSTRACT

Electrochemical cells and batteries incorporating iodine-containing cathode materials and cathode current collectors having an interposed viscous fluid layer containing dissolved iodine.

61 Claims, 4 Drawing Figures

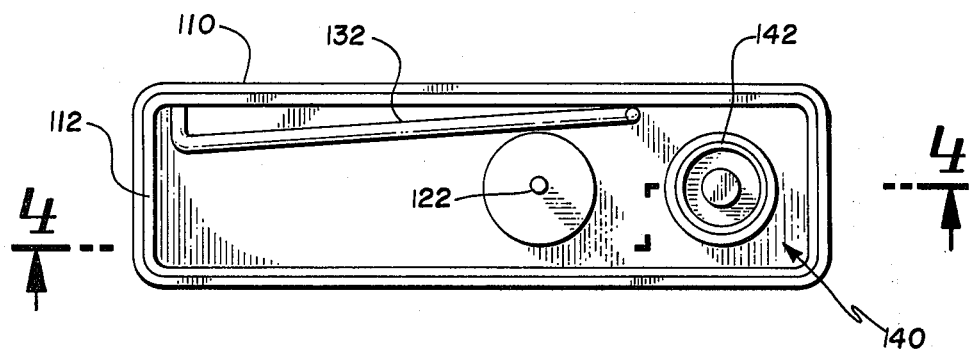
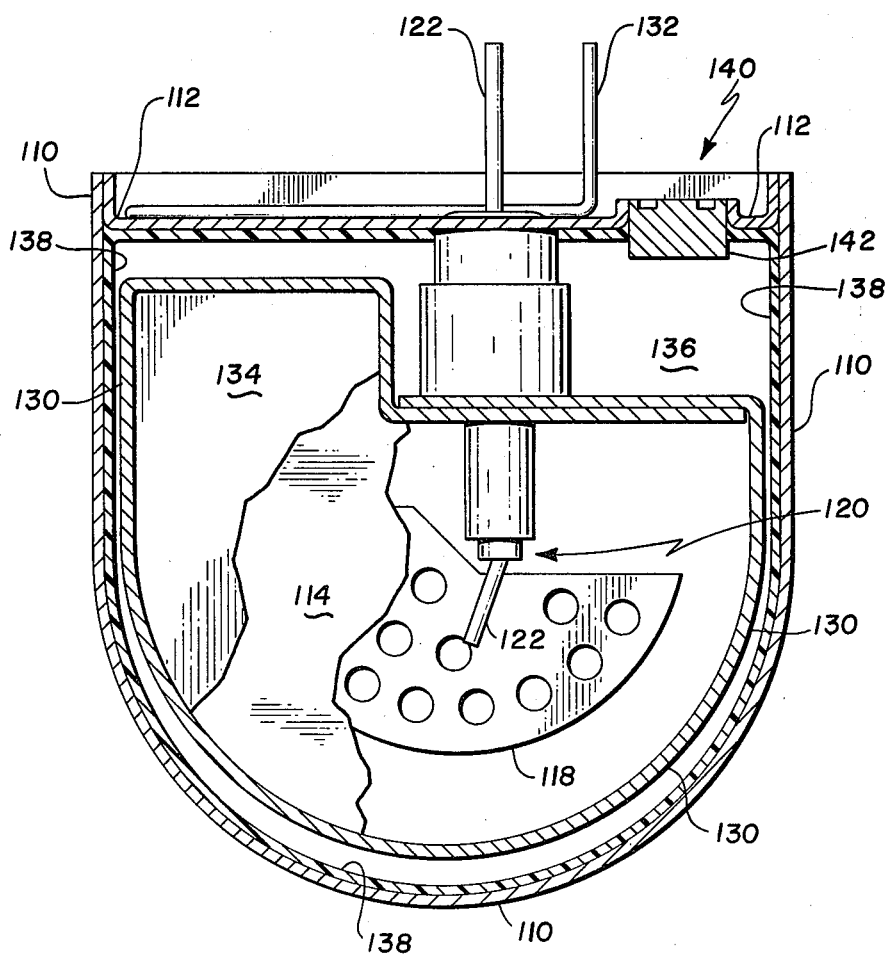

ELECTROCHEMICAL CELLS

I. DESCRIPTION

BACKGROUND OF THE INVENTION

This invention relates to the conversion of chemical energy to electrical energy and more particularly to a new and improved contact arrangement at the interface between the cathode and its current collector in electrochemical cells and batteries, herein referred to generally as electrochemical cells or simply as cells.

One area of use for the present invention is in electrochemical cells designed to provide electrical power to inaccessible devices such as implanted cardiac pacemakers. However, the present invention is applicable to a wide variety of batteries and electrochemical cells. It is particularly applicable to primary batteries intended to provide relatively high voltage and high energy density over long life under low current drain conditions.

In certain instances, dependant for the most part on the materials selected for the cell components, the cells of this invention may be assembled and encapsulated in a dry atmosphere, suitably in dry rooms or enclosures having a relative humidity less than about two percent, using substantially anhydrous and/or dried components. All of the cells and tests of cells described herein were prepared and performed substantially in sealed enclosures which, while not necessarily completely hermetic, did use substantially anhydrous components. In production embodiments, the electrochemical cells of this invention may be preferably enclosed in hermetically sealed enclosures such as welded stainless steel containers with appropriate electrical feedthrough arrangements for electrically contacting the cell components as is known in the art. The assembly of such cells preferably is accomplished in a dry room.

SUMMARY OF THE INVENTION

This invention is based on the discovery that in certain instances cathode materials comprised of organic iodine-containing mixtures (sometimes in the form of charge transfer complexes or donor-acceptor materials, all with or without additional iodine) may suffer from high impedence due to poor contact between the cathode material and the cathode current collector or electrical contact.

For example, in the case of poly(2-vinylpyridine) and iodine mixtures, it may be desirable to include iodine in relatively large amounts eg., in amounts greater than 20:1 weight ratio of iodine to poly(2-vinylpyridine). With a 50:1 mixture or a 100:1 mixture for example, a severe contact problem occurs between such a cathode material and its electrical contact or current collector. The contact problem exhibits itself in the form of high electrical impedance in the battery. It is believed caused by the precipitation of iodine from the cathode mixture at the collector surface, leading to the formation of a high resistance iodine layer between the cathode material and the collector.

In accordance with this invention, this problem is solved by providing for the presence of a conducting liquid layer between the cathode material and the cathode collector.

The liquid layer is preferably viscous to limit its flowability and to prevent its diffusion into the bulk cathode material. Thus, the liquid layer is preferably substantially immobile due to viscosity for long cell life.

The liquid layer must be conductive, at least more so than solid iodine is. Good conductivity has been achieved when using organic materials, particularly polymeric organic materials, in which iodine is soluble. Poly(2-vinylpyridine), poly(4-vinylpyridine), poly(paraminostyrene), poly(ethyleneoxide), and poly(propyleneoxide) are examples of such organic materials. The terms "polymer" and "polymeric" are meant herein to include any organic containing two or more monomer units.

Organic iodine containing mixtures are useful cathode materials because they form electrically conductive mixtures with iodine; that is, mixtures in which the electrical conductivity is much greater than that of the iodine alone. The mixtures are herein defined as to their composition in terms of the components as initially mixed together since in some instances reaction products may be produced which vary from the initial components forming the mixture. In such mixtures and preferably under substantially anhydrous conditions the iodine may be readily utilized as the electrochemically active constituent of the cathode material. The preferred organics are: poly(2-vinylpyridine) (P2VP), poly(4-vinylpyridine) (P4VP), poly(ethylene oxide), (PEO) such as POLYOX water soluble resins, and polypropylene oxide. POLYOX is a trademark used by Union Carbide Corporation for the poly(ethylene oxide it markets. Polymeric, monomeric (polymerizable and unpolymerizable) organics and mixtures thereof are acceptable as the organic. The preferred anode for improved electrochemical cells of this invention is lithium. However, any metal or alloy, which forms an ionically conductive iodide eg., silver, calcium, magnesium, sodium, lithium-magnesium, lithium-calcium alloys, and the like may be used. The mono-valent metals are generally preferred.

In their preferred form, the cells of the invention may be constructed, and are so shown herein, to form electrolytes in situ. For example, when the electrochemically active ingredients are lithium and iodine, a solid lithium iodide electrolyte forms between the anode and cathode after the cell has been constructed. Alternatively, the electrolyte can be preformed in whole or in part.

A modification which may be incorporated in these cells as a part of the operative relationship thereof is the use of an anode coated with poly(2-vinylpyridine) or other polymeric material such as described in the U.S. Mead et al U.S. Pat. No. 3,957,533 or a self-supporting poly(2-vinylpyridine) body such as described in U.S. Skarstad U.S. Pat. No. 4,182,798. The subject matter of these patents is incorporated herein by reference.

BRIEF DESCRIPTION OF THE DRAWINGS

FIG. 3 is a top elevational view of an electrochemical cell incorporating the invention.

FIG. 4 is a side elevational view in section along line 4—4 of FIG. 3 with parts removed illustrating the invention in detail.

DETAILED DESCRIPTION OF THE INVENTION

The invention is not directed to any particular cell or battery design but rather to any combination of components making up an electrochemical cell or battery wherein a viscous layer containing dissolved iodine is interposed between the iodine containing cathode material and the cathode current collector means. Consequently, the invention is not limited to any particular electrochemical cell design or structural arrangement. In physical arrangement, it is only required the anode and cathode means of the cell or battery, including the arrangement of the invention, be placed in operative relationship with each other in the broadest sense. For the purpose of being substantially anhydrous or substantially non-aqueous, cells are assembled and encapsulated in a dry atmosphere, preferably in a dry room or enclosure having a relative humidity less than about two percent using substantially anhydrous and/or dried components.

Figure 1:
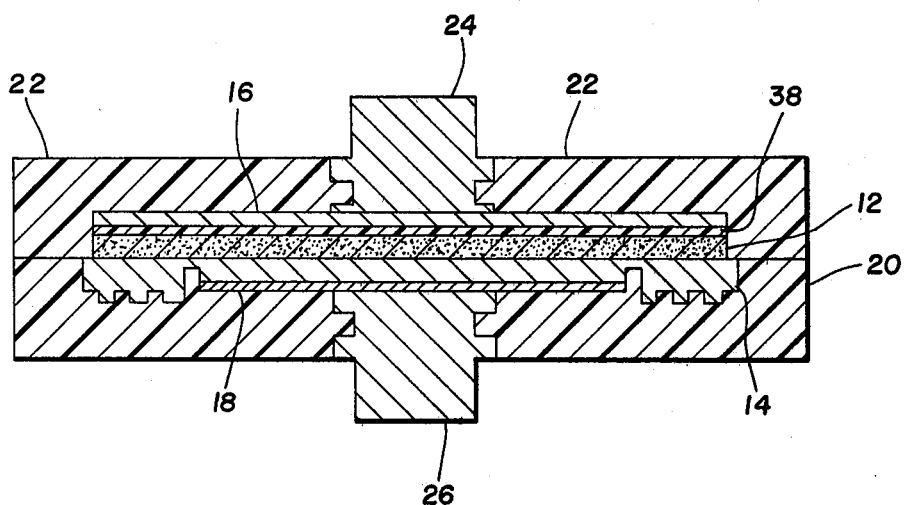
FIG. 1 comprises a schematic showing of an electrochemical test cell utilizing the invention.
Figure 2:
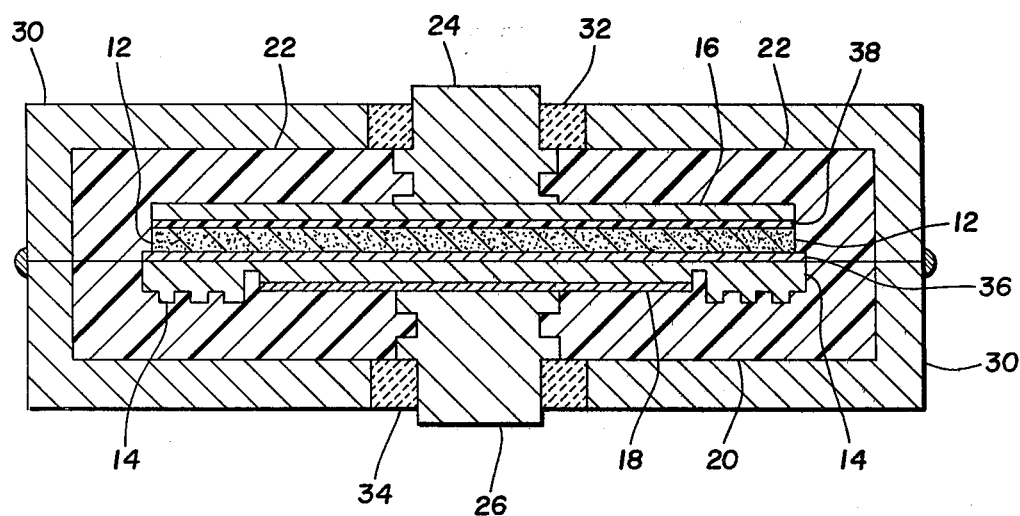
FIG. 2 comprises a schematic showing of a hermetically sealed cell including a body of poly(2-vinylpyridine) at the anode operative surface.

In the following description, illustrative cells in accordance with this invention, as shown in FIGS. 1 and 2, are flat, cylindrical cells with flattened, disc-like components. It should be understood that any configuration for the cell and components is satisfactory for this invention. The cathode material, such as a 50:1 or 100:1 mixture of iodine/poly(2-vinylpyridine) or poly(4-vinylpyridine), is indicated in the Figures at 12 whereas the anode, preferably lithium is indicated at 14. Both the anode and cathode are contacted by inert current collectors 16 and 18, respectively, which may be of metal such as Hastelloy or stainless steel. In the cells shown in FIGS. 1 and 2, the lithium anode is formed and then welded, as by pressing, peripherally around the current collector 18 so as to prevent contact between the collector and the cathode material 12. The electrochemically active components i.e., the cathode and anode 12 and 14, and current collectors 16 and 18 are enclosed in a cup-shaped chemically inert non-conductive container 20 which may be of a plastic material eg., Kynar, a trademark of Pennwalt Corporation for polyvinylidine fluoride, and a sealing lid 22 of the same material. These two components may be ultrasonically welded together or otherwise sealed. Other insulating, inert materials, such as Halar, a trademark of Allied Chemical Corporation for ethylene-chlorotrifluoroethylene and Tefzel, a trademark of E. I. DuPont de Nemours Co. for a copolymer of ethylene and tetrafluoroethylene, may be used for these components. Stainless steel leads 24 and 26 are molded into container components 20 and 22 and serve to electrically contact current collectors 16 and 18. For hermetically sealing the cell, the entire unit as shown in FIG. 2 is enclosed in a stainless steel container 30 with glass-to-metal seals 32 and 34 around the electrical leads 24 and 26, as is practiced in the art. Container 30 may conveniently be made in two cup-shaped parts as shown, which are welded together.

The cell of FIG. 2 includes a body or a film 36 of poly(2-vinylpyridine) polymer carried at the operative surface of anode 14, the operative surface being that surface which normally contacts the cell cathode, at least initially.

According to the invention, the cells of FIGS. 1 and 2 both include an interposed layer 38 between cathode material 12 and cathode current collector 16.

Layer 38 ultimately comprises a viscous immobile fluid containing dissolved iodine to decrease interfacial impedance between the cathode collector and the cathode material. However, this layer may be provided in different ways. For example, it may be provided as an initial coating of organic material, preferably polymeric, on the contact surface of collector 16. Since the organic material is a solvent for iodine, layer 38 will dissolve iodine from the cathode material 12 until an equilibrium condition in solubility is reached. This will vary depending on the particular organic material used. With the preferred material poly(2-vinylpyridine) this will be about 8:1 by weight.

To provide a coating of poly(2-vinylpyridine) as initial layer 38, the poly(2-vinylpyridine) may be dissolved in a suitable solvent carrier such as tetrahydrofuran (THF). 20 to 30% by weight poly(2-vinylpyridine) in solvent is useful for this purpose although the amount in solution is not critical. This is more fully disclosed in aforementioned U.S. Pat. No. 3,957,533.

The organic material may also be emplaced as initial layer 38 in the form of a preformed sheet or body. For example, if poly(4-vinylpyridine) is used, it is not readily soluble in solvent carriers but may be readily preformed as described in aforementioned U.S. Pat. No. 4,182,798. Poly(2-vinylpyridine) may also be incorporated into the cell in this fashion between the cathode collector and cathode material.

Whichever way the initial organic material is emplaced as initial layer 38, it will dissolve iodine from the cathode material 12. This process may be speeded-up by heat soaking the cells after assembly. For example, soaking at 100° C. for one hour is beneficial.

If other aforementioned organic materials are used they may be emplaced by various techniques. For example, paraaminostyrene (a liquid monomer) may be placed on the collector contact surface and polymerized in situ upon exposure to ultraviolet light to provide a coating of poly(paraaminostyrene). Polyethyleneoxide and polypropyleneoxide may be formed as a coating by dissolving in THF and painting the collector contact surface. THF is a suitable carrier solvent for this purpose. Repeated coatings of the dissolved organic material may be applied until a desired thickness is reached. This is not critical but a preferred thickness range of about 1 to 5 mils is desired for the above disclosed organic materials.

Cells of the type described above require no electrolyte as initially constructed. Consequently, no electrolyte per se is shown in the Figures. However, following assembly, an electrolyte does form in situ. The electrolyte builds up between the cathode and the anode, usually taking the form of a layer, due to the reaction between the anode metal and the iodine in the cathode. For example, in a cell having a lithium anode and iodine in the cathode, a lithium iodide electrolyte will form.

In accordance with the invention, a wide variety of iodine containing cathode materials may be used. For example, cathode materials of the type disclosed in U.S. Pat. Nos. 3,660,163; 3,674,562 or 4,148,975 may be used. Cathode materials such as those disclosed in U.S. Pat. Nos. 3,660,164 (Hermann et al); 3,352,720 (Wilson); 4,157,433 (Phillips); 4,182,798 (Skarstad) or 4,071,662 (Mead) may also be used. All of these patents are incorporated herein by reference.

Additionally, iodine and an oxygen-containing organic component or mixture of components may be mixed directly together in various relative amounts to form acceptable iodine-containing cathode material. In most cases, such a mixture is preferably heated at relatively modest temperatures such as 125° C. or so. This is particularly desirable when the oxygen-containing organic component is a polymeric compound. On the other hand, a non-polymer such as tetrahydrofuran (THF) may not require heating when mixing with the halogen. POLYOX, a poly(ethylene oxide) is heated with iodine for about one hour at about 125° C. for good results.

Some caution is necessary when compounding various organic components with the halogen. For example, mixtures of starch and iodine and some mixtures of poly(ethylene oxide) and iodine decompose violently above temperatures of about 125° C.

Typical oxygen-containing organic components for use with iodine may be selected from the group consisting of the following:
ethers such as poly(vinylmethylether), tetrahydrofuran (THF), diethylether, butylmethylether, poly(ethylene oxide) (PEO), poly(propylene oxide) (PPO) and polyvinylbutyral;
alcohols such as poly(vinylalcohol), ethanol, phenol, methylcellulose and starch
ketones such as acetone, poly(methylvinylketone) and methylethylketone;
esters such as the following vinyl and polyvinyl esters: poly(vinyl succinate), poly(vinylacetate), vinylacetate and poly(vinylacetate);
acids such as poly(acrylic acid) (PAA), acetic acid and oxalic acid;
salts such as sodium and ammonium salts of poly(acrylic acid) and sodium acetate;
anhydrides such as acetic anhydride, and
the following specific compounds: propylene oxide poly(N-vinylprrolidone) propylene carbonate triphenylphosphineoxide (TPP).

Additionally, the above compounds may be mixed together or may be mixed with other materials such as:
poly(ethylene oxide)+poly(2-vinylpyridine) for example in equal amounts (number of oxygen atoms equals number of nitrogen atoms) then mixed with iodine in a ratio of 8 moles of iodine ($I_2$) per mole of oxygen plus nitrogen, and
poly(ethylene oxide)+triphenylphosphineoxide, as above.

The oxygen-containing organic compounds for use with iodine as described above, can be characterized generally as being non-nitrogen containing compounds in the sense that if nitrogen is present it is not present in the same fashion as the nitrogen contained in the pyridine-type cathode material compounds eg., poly(2-vinylpyridine) and so forth. In these latter compounds the nitrogen is included in the compound so as to be able to share electrons with a halogen such as iodine. With the oxygen-containing compounds, the oxygen is believed to be involved in electron sharing with the halogen. There is an exception to this that poly(N-vinylprrolidone) contains an active nitrogen in addition to an active oxygen.

As can be seen from the above description of cathode materials, any iodine-containing material may be used as a cathode material in which iodine is available for electrochemical reaction and wherein the conductivity of the material is suitable for the particular cell involved.

Viscosity may be important in certain applications to prevent any substantial segregation of the various cathode components. This will vary from solid to liquid depending on the particular cathode combination and its intended use. Viscosity may be controlled by adding either a thinning solvent or a thickening agent (collectively referred to herein as viscosity adjusting agents) to the cathode material depending on whether it is desired to increase viscosity or decrease it. Thinning solvents such as chloroform and orthodichlorobenzene, are illustrations of inert solvents which may be used. Alternatively, a thinning solvent may be used which is an oxygen-containing compound of this invention or a mixture of oxygen-containing compounds of this invention. Examples of compounds which are useful as thinning solvents include ethanol, acetone, tetrahydrofuran and diethylether. Illustrative inert thickeners are fumed $SiO_2$, finely divided $AlI_3$, finely divided $Al_2O_3$, sheet silicates such as montmorillonite, finely ground lithium iodide, hydrocarbon polymers eg., polystyrene, polybutene, poly(alpha-methylstyrene) and styrene-butadinene rubbers. Alternatively, a thickener may be used which is an oxygen-containing compound or a mixture of oxygen-containing compounds. Examples of compounds which are useful as thickening agents include poly(ethyleneoxide), poly(propyleneoxide) and poly(N-vinylpyrrolidone).

Iodine, being a particulate material, may be used in the various cathode materials as either a course particle form or a finely divided particle form, such as iodine which has been milled to a powder. It is preferred that finely divided iodine be used.

In a preferred cell construction, particularly for cardiac pacemaker power sources, it has become desirable to provide lithium-iodine power sources wherein the iodine-containing cathode material is melted and poured into a metal container or can which functions as the cathode current collector. The following listed U.S. Patents show various lithium-iodine batteries or cells of such a type making use of cell containers in which a fluid cathode material is introduced into the container through a filler opening: U.S. Pat. Nos. 4,105,833; 4,135,519; 4,132,836; 4,166,887 and 4,211,832. All of these patents are incorporated herein by reference.

Referring now to FIGS. 3 and 4, a preferred power source cell incorporating the invention is described. It is a hermetically sealed lithium-iodine cell. The cell comprises a container 110 of metal such as stainless steel. Container 110 has an open top or end which is closed by means of a lid 112, also of stainless steel, which is welded to container 110. The cell further includes anode means, in this case comprising a lithium element 114 having an embedded anode current collector element 118. Current collector 118 is a relatively thin element of nickel or zirconium. A conductor lead feedthrough assembly 120 including lead 122 of stainless steel or other suitable metal is spot welded to collector element 118. Electrical lead 122 is of sufficient length to extend out of the container 110 for making an external electrical connection thereto. Conductor 122 is sealed from the remainder of the cell contents by means including an insulator element generally designated 124 which surrounds lead 122. Insulator 124 is of a material which in addition to being a non-conductor of electricity is also non-reactive with the contents of the cell, such as the iodine-containing cathode materials utilized in the cell illustrated. One form of material found to perform satisfactorily are the fluoropolymers, such as the one available under the Tradename "Halar", a trademark of the Allied Chemical Company. Other non-reactive materials may be used for insulator 124.

The anode assembly comprising the lithium element 114, for example, and current collector 118 is preferably fitted within an anode holding or retention means comprised of a peripheral frame member in the form of a band 130 which peripherally encloses the anode assembly leaving the major lateral surface areas of the lithium element exposed. Band 130 is preferably of the aforementioned fluoropolymer material or any similar material which is non-reactive with the cell contents. In the present illustration, lithium element 114 is of a sandwich-like construction in which two pieces of lithium are brought together with collector 118 therebetween. Band 130 surrounds the peripheral edge of lithium element 114 engaging the peripheral contact surfaces provided at the joint area formed between the lithium pieces. The opposite ends of band 130 are provided with apertures of a size sufficient to receive a portion of insulator 124. These ends are overlapped adjacent the insulator as shown in FIG. 2 to provide a wrap-around structure.

The anode assembly may be provided with an organic electron donor coating 134 such as poly(2-vinylpyridine as is known in the art and then positioned in container 110 as shown in FIG. 2 with the lateral anode operative surfaces spaced from the inner surface of the container. Lid 112 is then welded to container 110.

In the particular embodiment illustrated container 110, being of electrically conducting material, serves as a cathode current collector in direct electrical contact with the cathodic contents of container 110. Consequently, an electrical lead 132 may be attached directly to container 110 for cathodic contact. In accordance with the invention, container 110 and lid 112 are provided with the inner initial coating 138 of organic material as previously described. The coating is preferably placed on the inner surfaces of these components before they are assembled together.

An iodine cathode material 136 such as iodine mixed with an organic donor component poly(2-vinylpyridine material, as is also known in the art, is poured through a suitable filler opening 140 in lid 112 to fill container 110 and operatively contact the surfaces of the lithium anode. For example, a common cathode material is prepared by heating a poly(vinylpyridine) organic material, such as poly(2-vinylpyridine), mixed with iodine, to a temperature greater than the crystallization temperature of iodine, for example about 300° F. Consequently, the mixture becomes fluid. The amount of iodine is ordinarily greater than about 50% by weight of the resulting mixture. The resulting mixture upon heating is poured into container 110 to substantially fill it. The amount of material introduced into the container is preferably sufficient to contact the lateral surfaces of lithium element 140 and to reach a level at or adjacent the interior surface of lid 112. The opening in lid 112 is then hermetically sealed with plug 142 such as a stainless steel plug which is welded to lid 112.

Upon addition of the cathode material 136 to the cell and contact between it and initial layer 138, iodie diffuses into the layer to form the liquid layer interface as previously noted. For this particular cell, the initial layer 138 is preferably poly(2-vinylpyridine or poly(4-vinylpyridine).

Again, initial layer 138 may take the form of a coating as described above or it may take the form of a preformed material such as a sheet or a molded cup which is placed in container 110.

In making and assembling the cells of this invention it is merely required that the component parts be provided and assembled with provision for placing an initial coating 138 on the cathode collector means or an initial preformed body 138 between the cathode material and the current collector means prior to complete assembly of the cell in operative relationship.

Tables 1 and 2 contain test data on cells of the type shown in FIGS. 3 and 4. As can be seen, cell impedance, averages 74.4 and 70.91 ohms, respectively. Comparable cells without the initial coating 38 had cell impedances ranging from 100 to 300 ohms.

TABLE 1

| | NOM. STOICIOMETRIC Q: | | 3090 mah | |
| | NOM. LOAD: | | 100 K Ω | |
| | NOM. CURRENT: | | 27.5 μA | |
| | NOM. TEMP: | | 37° C. | |
| Cell | Days On Load | Q. Deliv (mAHR) | LCV (mV) | IMPED. Ohms |
|---|---|---|---|---|
| 1 | 34.8 | 23.4 | 2796 | 73 |
| 2 | 34.8 | 23.4 | 2795 | 75 |
| 3 | 34.8 | 23.3 | 2796 | 72 |
| 4 | 34.8 | 23.4 | 2795 | 71 |
| 5 | 34.8 | 23.4 | 2792 | 70 |
| 6 | 34.8 | 23.4 | 2795 | 75 |
| 7 | 34.8 | 23.4 | 2798 | 79 |
| 8 | 34.8 | 23.4 | 2797 | 78 |
| 9 | 34.8 | 23.4 | 2794 | 79 |
| 10 | 34.8 | 23.4 | 2793 | 68 |
| 11 | 34.8 | 23.4 | 2795 | 74 |
| 12 | 34.8 | 23.4 | 2798 | 78 |
| AVERAGE | 34.89 | 23.42 | 2795.3 | 74.4 |
| STND. DEV. | 0.00 | 0.02 | 1.8 | 3.6 |

TABLE 2

| | NOM. STOICIOMETRIC Q: | | 2740 MAh | |
| | NOM. LOAD: | | 100 K Ω | |
| | NOM. CURRENT: | | 27.5 μA | |
| | NOM. TEMP: | | 37° C. | |
| Cell | Days On Load | Q. Deliv (mAHR) | LCV (mV) | IMPED. Ohms |
|---|---|---|---|---|
| 1 | 34.8 | 23.3 | 2791 | 76 |
| 2 | 34.8 | 23.3 | 2791 | 69 |
| 3 | 34.8 | 23.4 | 2790 | 76 |
| 4 | 34.8 | 23.3 | 2790 | 70 |
| 5 | 34.8 | 23.4 | 2789 | 68 |
| 6 | 34.8 | 23.3 | 2790 | 72 |
| 7 | 34.8 | 23.3 | 2790 | 65 |
| 8 | 34.8 | 23.3 | 2788 | 68 |
| 9 | 34.8 | 23.4 | 2789 | 71 |
| 10 | 34.8 | 23.3 | 2790 | 72 |
| 11 | 34.8 | 23.3 | 2792 | 72 |
| AVERAGE | 34.89 | 23.38 | 2790.0 | 70.9 |
| STND. DEV. | 0.00 | 0.02 | 1.0 | 3.3 |

Having described the invention by way of illustration, the exclusive property rights are defined by the following claims.

I claim:

1. An electrochemical cell comprising anode and cathode means in operative relationship, the cathode means comprising:
    an iodine-containing cathode;
    cathode current collector means, and
    a conductive liquid layer interposed between the cathode and the currect collector for electrically interconnecting the two, the liquid layer comprising iodine dissolved in a solvent.

2. The cell of claim 1 wherein the cathode comprises a mixture of an iodine acceptor component and an organic donor component.

3. The cell of claim 2 wherein the organic component of the cathode is poly(2-vinylpyridine).

4. The cell of claim 3 wherein the ratio of cathode iodine to poly(2-vinylpyridine) is greater than about 20:1.

5. The cell of claim 4 wherein the ratio is at least 50:1.

6. The cell of claim 1 wherein the liquid layer is comprised of a polymeric organic material and dissolved iodine.

7. The cell of claim 6 wherein the polymeric organic material is poly(2-vinylpyridine).

8. The cell of claim 7 wherein the cell is treated by a heat soak following its assembly.

9. The cell of claim 6 wherein the polymeric organic material is poly(4-vinylpyridine).

10. The cell of claim 1 wherein the layer is about 1–5 mils thick.

11. The cell of claim 1 wherein the cathode includes poly(4-vinylpyridine).

12. The cell of claim 1 wherein the collector is in the form of a cell container, the cathode mixture is contained in the container and the liquid layer lines the container.

13. The cell of claim 1 wherein the source of the iodine in the liquid layer is the cathode mixture.

14. An electrochemical cell comprising: anode and cathode means in operative relationship, the cathode means comprising:
   an iodine-containing cathode;
   a cathode current collector, and
   a conductive, preformed body, at least initially upon assembly of the cell, comprised of a polymeric organic material interposed between the cathode and the collector for electrically interconnecting the two upon the dissolution of iodine therein.

15. The cell of claim 14 wherein the cathode material comprises a mixture of iodine and an organic component.

16. The cell of claim 15 wherein the cathodic organic component is poly(2-vinylpyridine).

17. The cell of claim 16 wherein the ratio of iodine to poly(2-vinylpyridine) is greater than 20:1.

18. The cell of claim 17 wherein the ratio is at least 50:1.

19. The cell of claim 15 wherein the cathode organic component is poly(4-vinylpyridine).

20. The cell of claim 14 wherein the dissolved iodine is cathode iodine.

21. The cell of claim 14 wherein the polymeric organic material is poly(2-vinylpyridine).

22. The cell of claim 14 wherein the organic material is poly(4-vinylpyridine).

23. The cell of claim 14 wherein the collector is in the form of a cell container, the preformed body is in the form of an envelope lining the container, and the cathode mixture is contained in the envelope.

24. An electrochemical cell, as initially assembled, comprising anode means and cathode means in operative relationship, the cathode comprising:
   an iodine-containing cathode;
   cathode current collector means, and
   a coating on at least those portions of the current collector means adapted for contact with the cathode mixture, the coating being comprised of an organic material for dissolving cathode iodine and forming a conductive interface between the cathode and the collector means.

25. The cell of claim 24 wherein the cathode comprises iodine and an organic component.

26. The cell of claim 25 wherein the organic component is comprised of poly(2-vinylpyridine).

27. The cell of claim 26 wherein the ratio of iodine to poly(2-vinylpyridine) is greater than 20:1.

28. The cell of claim 27 wherein the ratio is at least 50:1.

29. The cell of claim 24 wherein the coating is poly(2-vinylpyridine).

30. The cell of claim 24 wherein the coating is poly(4-vinylpyridine).

31. The cell of claim 24 wherein the collector is in the form of a cell container, the coating lines the interior of the container and the cathode mixture is contained therein.

32. The cell of claim 24 wherein the coating is about initially 1–5 mils thick.

33. An improvement in the method of making an electrochemical cell of the type having an iodine-containing cathode and a cathode current collector wherein a coating is provided on the collector, at least on those portions which contact the cathode, of a layer of a polymeric organic material, capable of dissolving cathode iodine and forming a conductive liquid prior to its contact with the cathode.

34. The method of claim 33 wherein the polymeric organic material is poly(2-vinylpyridine).

35. The method of claim 34 wherein the coating is about 1–5 mils thick.

36. The method of claim 34 wherein the polymeric organic material is poly(4-vinylpyridine).

37. The method of claim 36 wherein the coating is about 1–5 mils thick.

38. The method of claim 33 including the step of subjecting the cell components to a heat soak following the coating of the collector and its contact with the cathode.

39. The method of claim 38 wherein the heat soak comprises a temperature of about 100° C. and a duration of about 1 hour.

40. The method of claim 38 wherein the heat soak step takes place following the final assembly of the cell components.

41. The method of claim 40 wherein the heat soak comprises a temperature of about 100° C. and a duration of about 1 hour.

42. A method of making an electrochemical cell wherein the cathode comprises an iodine-containing material and a current collector having a contact surface area for contacting the iodine-containing material, comprising the steps of:
   providing anode means;
   providing a cathode current collector having a contact surface area;
   providing an iodine-containing cathode material;
   placing a preformed body of polymeric organic material against the contact surface of the current collector, the material being capable of dissolving iodine; and
   assembling the anode means, the cathode material, the preformed body and the cathode current collector in electrochemically operative relationship with the preformed body between the cathode material and the current collector.

43. The method of claim 42 wherein the preformed body is poly(2-vinylpyridine).

44. The method of claim 43 wherein the body is about 1–5 mils thick.

45. The method of claim 42 wherein the cathode material comprises poly(2-vinylpyridine) and iodine.

46. The method of claim 45 wherein the ratio of iodine to poly(2-vinylpyridine) is greater than 20:1.

47. The method of claim 46 wherein the ratio is at least 50:1.

48. The method of claim 47 wherein the heat soak comprises a temperature of about 100° C. and a duration of about 1 hour.

49. The method of claim 47 wherein the heat soak step takes place following the final assembly of the cell components.

50. The method of claim 46 wherein the heat soak comprises a temperature of about 100° C. and a duration of about 1 hour.

51. The method of claim 46 wherein the heat soak step takes place following the final assembly of the cell components.

52. The method of claim 41 wherein the preformed body is poly(2-vinylpyridine).

53. The method of claim 45 including the additional step of subjecting the cell components to a heat soak following the coating of the collector and its contact with the cathode.

54. The method of claim 53 wherein the heat soak comprises a temperature of about 100° C. and a duration of about 1 hour.

55. The method of claim 45 wherein the heat soak step takes place following the final assembly of the cell components.

56. The method of claim 55 wherein the heat soak comprises a temperature of about 100° C. and a duration of about 1 hour.

57. The method of claim 42 including the additional step of subjecting the cell components to a heat soak following the coating of the collector and its contact with the cathode.

58. The method of claim 57 wherein the heat soak step takes place following the final assembly of the cell components.

59. The method of claim 58 wherein the heat soak comprises a temperature of about 100° C. and a duration of about 1 hour.

60. An electrochemical cell comprising anode and cathode means in operative relationship; the cathode means comprising:
    an iodine-containing cathode;
    cathode current collector means, and
    a quantity of iodine dissolved in a solvent interposed between the cathode and current collector.

61. An electrochemical cell comprising anode and cathode means in operative relationship, the cathode means comprising:
    an iodine-containing cathode;
    cathode current collector means, and
    a quantity of an iodine solvent interposed between the cathode and the current collector.

* * * * *